United States Patent [19]
Feterl

[11] 4,002,147
[45] Jan. 11, 1977

[54] BALE HANDLING APPARATUS
[75] Inventor: Leon G. Feterl, Salem, S. Dak.
[73] Assignee: SOS Consolidated, Inc., Birmingham, Mich.
[22] Filed: June 27, 1975
[21] Appl. No.: 591,112

Related U.S. Application Data

[63] Continuation-in-part of Ser. No. 452,440, March 18, 1974, Pat. No. 3,892,202.
[52] U.S. Cl. .............................. 119/60; 214/131 A; 214/390; 214/766
[51] Int. Cl.² ........................................ A01K 5/00
[58] Field of Search .................... 119/60, 58, 20, 1; 172/19; 214/766, 145 A, 390, 131 A, 501

[56] References Cited
UNITED STATES PATENTS

| | | | |
|---|---|---|---|
| 872,032 | 11/1907 | Tolle | 119/58 |
| 2,427,575 | 9/1947 | Sedore | 214/766 X |
| 2,736,442 | 2/1956 | Westholt | 119/20 |
| 3,362,554 | 1/1968 | Fortier | 214/766 |
| 3,779,208 | 12/1973 | Gay | 119/1 |
| 3,845,871 | 11/1974 | DiLillo | 214/145 A |
| 3,876,090 | 4/1975 | Holland | 214/766 |

Primary Examiner—J.N. Eskovitz
Attorney, Agent, or Firm—Williamson, Bains & Moore

[57] ABSTRACT

Apparatus for handling and feeding large hay bales comprising the separable, cooperative, combination of a coupler unit adapted to be attached to a three-point lift hitch on a tractor, and a lift fork unit which can be readily converted into a bale feeding container by removably securing a pair of upright wall assemblies to its opposite sides. The wall assemblies have feeding spaces therein through which livestock may project their heads to reach a large hay bale supported inside the container on the lift arms of the lift fork unit. A latch device on the coupler unit is releasably engaged with coupling means on the lift fork unit in such a way that the operator of a tractor on which the coupler is mounted may actuate controls to release the latch from the tractor operator's seat. Utilizing the coupler unit on a tractor, the lift fork-feeding container assembly can be transported with a bale in it to a livestock feeding area and deposited there for feeding purposes by simply releasing the coupler latch device from the lift fork unit.

17 Claims, 4 Drawing Figures

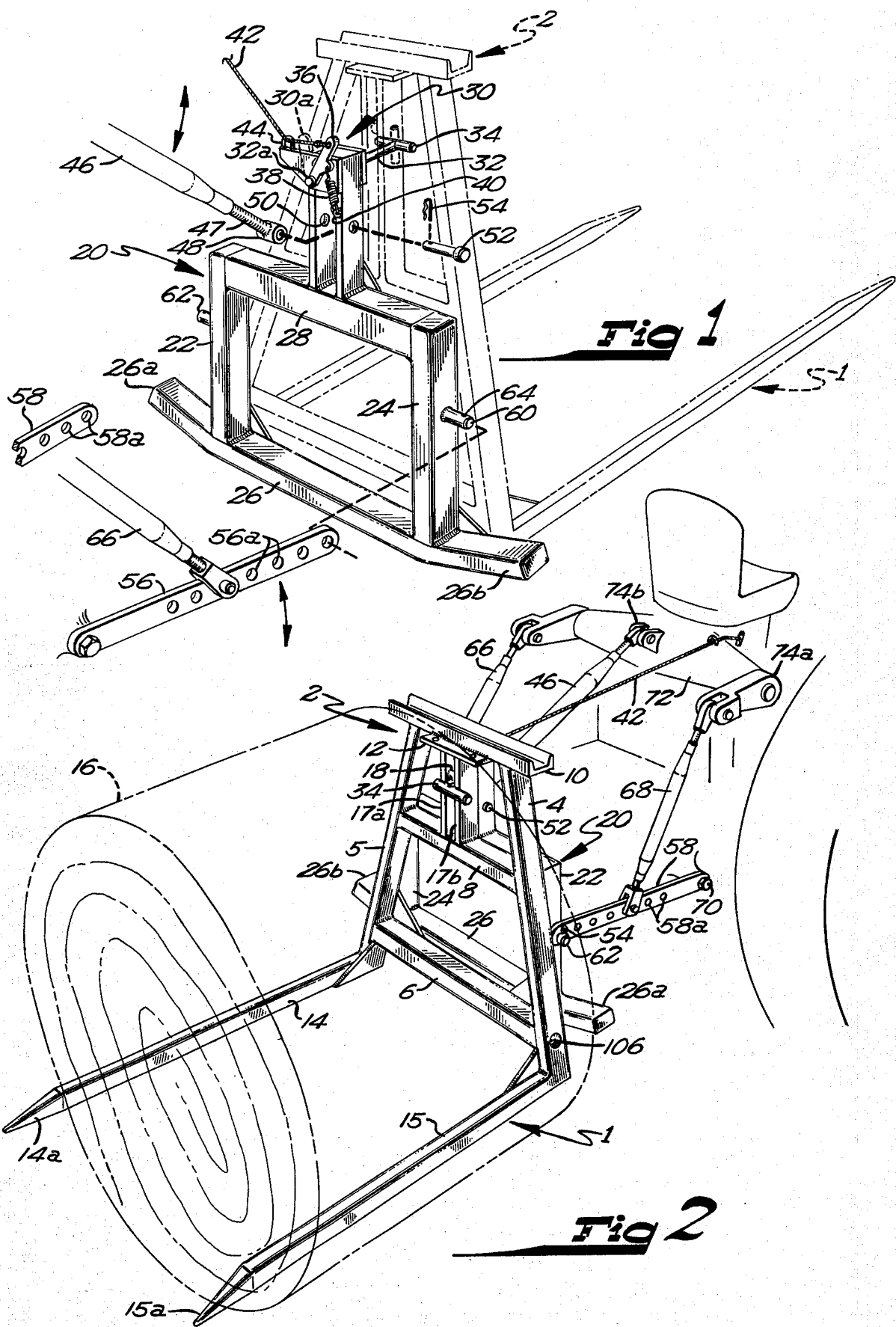

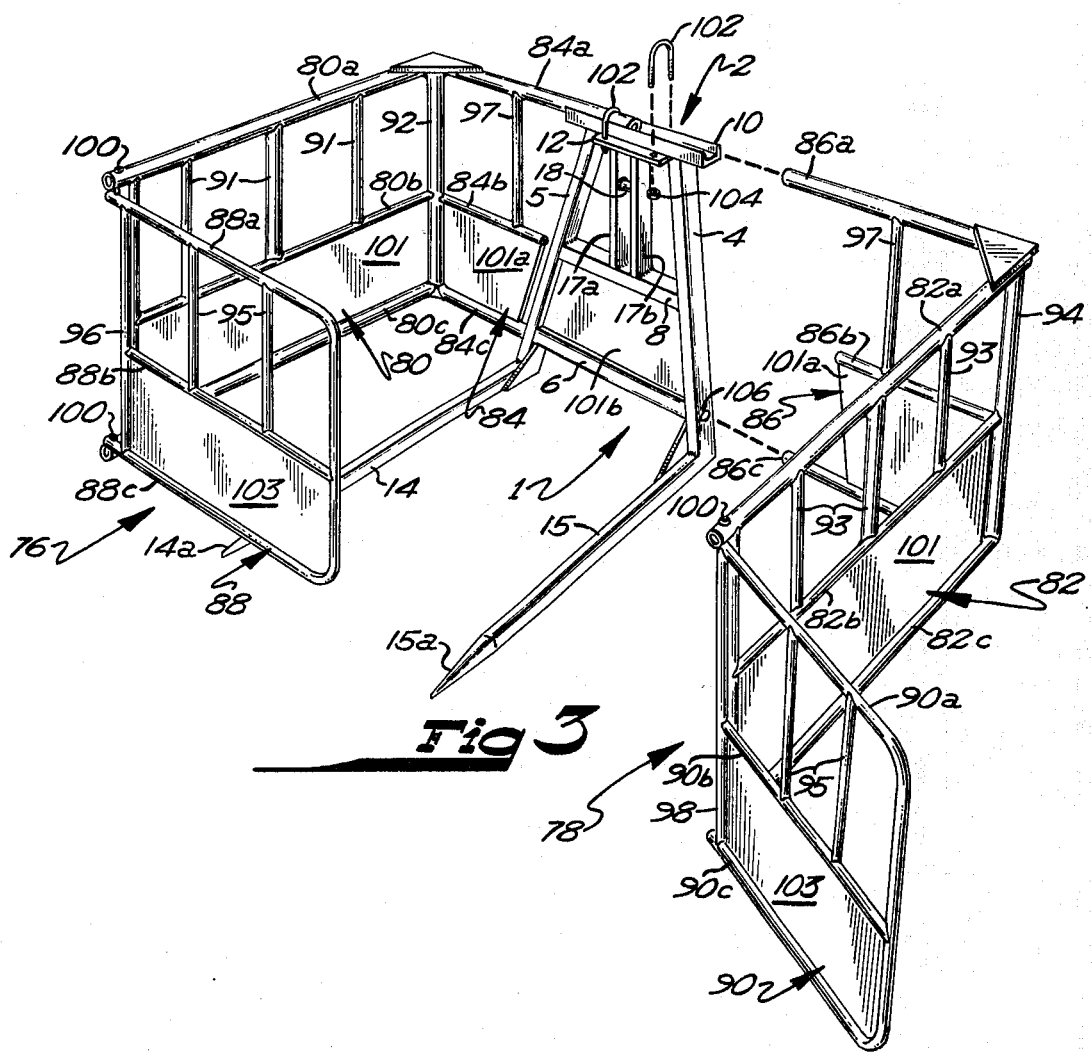
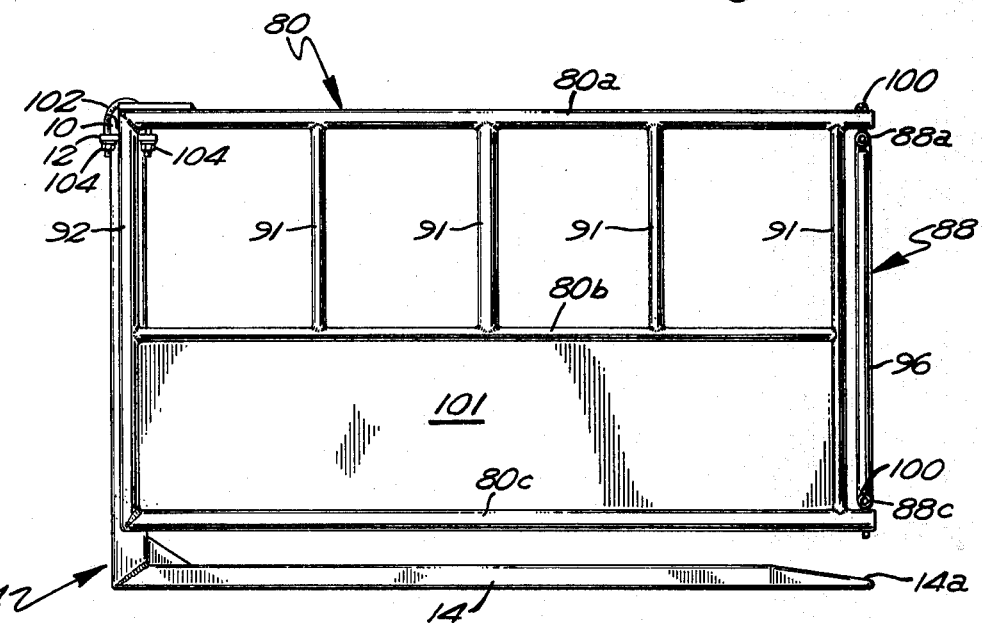

BALE HANDLING APPARATUS

BACKGROUND OF THE INVENTION

This application is a continuation-in-part of my co-pending application entitled Bale Handling and Feeding Container, filed on Mar. 18, 1974 under Ser. No. 452,440, and issued as U.S. Pat. No. 3,892,202 on July 1, 1975.

Pickup devices of various kinds have been used for handling and transporting large hay bales. For example, power operated lift forks mounted on tractors have been employed to pick up large hay bales now being widely used to feed cattle. Such hay bales are normally round, and may be as large as 6 feet in diameter and on the order of 1500 lbs. in weight. It has been the practice in the past to transport such large hay bales by power operated lift forks or other comparable devices mounted on a vehicle. Once the bale has been transported in this manner to a feeding lot, it is then placed inside of a separate, feeding container of some kind in order to achieve the necessary controlled access to the hay bale by livestock.

The aforesaid co-pending application is directed to a bale handling container which advantageously serves both as a pickup and transporting device for moving a large round hay bale to a feeding lot, and also functions as a feeding container from which cattle may consume, in a restricted manner, a large bale held within the container. This application is directed to a further improvement and modification of such transporting and feeding apparatus for large hay bales. My improved hay bale handling system utilizes a lift fork unit as a basic, multiple purpose module. As is hereinafter set forth, the lift fork unit can be transported on a tractor lift hitch by a special coupler unit for simply transporting hay bales, and can be converted into a bale feeding container which can be left in a feeding area with a large bale in it for feeding livestock.

BRIEF SUMMARY OF THE INVENTION

The bale handling apparatus of this invention is particularly characterized by a lift fork unit which is so constructed that it can be utilized as either a simple lift fork for transporting loads of various kinds, including large hay bales, or as the basic structural and lifting component of a bale handling and feeding container formed by removably securing a pair of upright wall assemblies to opposite sides of the lift fork unit. The lift fork unit preferably comprises an upright frame and a pair of spaced apart lift arms projecting generally horizontally from adjacent the bottom of the frame.

The aforesaid multiple functions of the lift fork unit are advantageously carried out by utilizing a unique, specially designed coupler unit adapted to be mounted on a power lift hitch on a tractor or other vehicle. The coupler unit preferably comprises a rigid, upstanding portion on which a latch device is mounted for releasable engagement with cooperating coupling means on the upright frame of the lift fork unit. The latch means preferably takes the form of a lift arm which extends substantially horizontally between upright members of the lift fork frame under a horizontal lift member thereon for lifting engagement therewith.

The aforesaid latch and lift arm of the coupling unit is advantageously movable between coupling and non-coupling positions relative to the cooperating coupling means on the lift fork unit by control means operable from the drivers seat of a tractor vehicle on which the coupling unit is mounted. This feature permits the lift fork-feeding container assembly having a hay bale therein to be quickly and easily deposited at a feeding area by simply actuating the aforesaid latch device to its non-coupling or release position, thereby separating the lift fork unit from the coupling unit to deposit the lift fork-feeding container assembly on the ground.

A further advantageous feature of the aforesaid coupling unit resides in the provision of a horizontal push bar, cross member adjacent the bottom thereof which bears against the rear face of a cross beam adjacent the bottom of the lift fork unit. This provides maximum pushing force against the low level lift arms of the lift fork unit for insertion under and engagement with loads of various kinds.

The aforesaid lift fork unit may be readily converted into a bale handling and feeding container by removably mounting a pair of upright wall assemblies on opposite sides of the upright frame of the lift fork unit, each of the wall assemblies having wall means cooperating with the upright frame of the lift fork unit to define a hay bale handling and feeding container. The wall portions of the upright wall assemblies have feeding spaces therein through which livestock may project their heads to feed on a large hay bale within the container. Each of the upright wall assemblies preferably includes a side and a rear wall segment, with the rear wall segments having horizontally extending support elements which are slidably received within complimentary support portions on each side of the upright frame of the lift fork unit for quick and easy attachment thereto.

The aforesaid wall portions of the upright wall assemblies of the bale container include gate sections swingably mounted at the front end thereof for swinging movement from a closed position across the normally open front end of the container to an open, non-obstructing position with respect to the front end of said container for picking up a hay bale therein on the lift arms of the lift fork unit. Ground friction is minimized to facilitate the insertion of the lift arms under a hay bale by positioning the lift arms of the lift fork unit so that they are at a lower level than the lowermost portions of the walls of the upright wall assemblies and are the only elements in contact with the ground when the lift fork unit and container assembly is resting on the ground.

These and other objects and advantages of my invention will become readily apparent as the following description is read in conjunction with the accompanying drawings wherein like reference numerals have been used to designate like elements throughout the several views.

BRIEF DESCRIPTION OF THE DRAWINGS

FIG. 1 is a rear, perspective view of the coupling unit of this invention showing its manner of attachment to lift hitch components on a tractor, as well as to a lift fork unit;

FIG. 2 is a front, perspective view of the lift fork unit and coupler unit assembly;

FIG. 3 is a front, perspective view of the lift fork unit, feeding container assembly; and FIG. 4 is a rear, perspective view of the fully assembled lift fork unit-feeding container assembly.

DESCRIPTION OF THE PREFERRED EMBODIMENT

Referring now to the drawings, there is shown in FIG. 2 a preferred embodiment of a lift fork unit particularly shaped and constructed for carrying on the bale handling functions of this invention. The lift fork unit is generally designated by reference numeral 1 and includes an upright frame portion 2 having upright side frame members 4 and 5. These side frame members are interconnected by a plurality of horizontal beam members 6, 8 and 10 extending therebetween. The upright frame structure 2 thereby formed is preferably of generally A-frame configuration as shown. This particular configuration for lift fork frame structure 2 with its relatively wide base provides a particularly stable structure for carrying loads over uneven terrain.

For reasons hereinafter set forth, top cross beam member 10 of the A-frame structure 2 is preferably channel-shaped as shown to provide an elongated, horizontally extending channel. An apertured bracket plate 12 is secured, as by welding, to the underside of channel beam 10 and projects outwardly beyond the front and rear faces thereof as shown in FIGS. 1 and 2. Bracket plate 12 serves as an attachment device for wall assemblies removably mountable on the A-frame structure 2 in the manner explained below.

Affixed to the bottom of upright side frame members 4 and 5 and projecting generally horizontally therefrom are a pair of lift arms 14 and 15. These arms are pointed as shown at their forward ends to facilitate their insertion under loads, such as the round hay bale 16 shown in phantom lines on lift fork unit 1 in FIG. 2.

To facilitate the lifting and handling of lift fork unit 1, upright frame 2 thereof is provided with coupling means for engagement by a coupling and lift device. Although such coupling means may take various forms, it preferably comprises a pair of closely spaced, vertical members 17a, 17b and a horizontal lift bar member 18 extending therebetween. Vertical members 17a and 17b are secured in the upright position shown between horizontal beam members 8 and 10. Horizontal bar member 18 is secured by welding or other appropriate means between vertical members 17a and 17b, at a vertical location intermediate horizontal beam members 8 and 10.

A specially designed coupling unit generally designated by reference numeral 20 in FIG. 1 is utilized to lift, handle and transport lift fork unit 1. Coupling unit 20 is comprised of a rigid, upstanding structural portion formed by upstanding legs 22 and 24 and cross members 26 and 28 extending therebetween at vertically spaced locations. This combination of elements forms a generally rectangular, upright structure on which an upper, mast 30 is mounted. Mast 30 may be fabricated as shown from steel plates welded or otherwise secured to upper cross member 28. Mast 30 rotatably supports latch means in the form of a lift arm 32. A crossbar 34 affixed to the forward end of latch arm 32 serves as a locking or latch head for coupling engagement with closely spaced, vertical members 17a and 17b of lift fork upright frame 2. Latch arm 32 extends horizontally through spaced plates 30a and 30b on mast 30 and is rotatably supported therein for rotational movement about its longitudinal axis. The rear end 32a of latch arm 32 is attached to a pivot link 36 for rotation therewith. Link 36 is normally biased to the position shown in FIG. 2 wherein latch head bar 34 is oriented horizontally by a coil spring 38. Spring 38 is connected as shown between latch arm 36 and a retention eye on mast 30. Pivot link 36 is utilized to rotate latch arm 32 between coupling and uncoupling positions relative to the aforesaid coupling means of upright frame 2 of lift fork unit 1. In the coupling position of latch arm 32 shown in FIGS. 1 and 2, latch head or bar 34 extends horizontally and bears against the forward faces of vertical members 17a and 17b of lift fork frame 2. Crossbar 34 of latch head 34 is of sufficient length to span the space between vertical coupling members 17a and 17b of the lift fork unit. By pivoting link 36 in a counterclockwise direction as viewed in FIG. 1, against the bias of spring 38, latch arm 32 can be rotated therewith to bring latch head 34 to the upright, non-coupling position shown in phantom lines in FIG. 2. This permits coupling unit 20 to be disengaged from upright frame 2 of lift fork unit 1. Although the actuation of pivot link 36 may be accomplished by various types of control means, I have found it convenient and satisfactory to accomplish this by means of a control rope 42 attached to the upper end of pivot link 36 and extending through a guide loop 44 affixed to one end of mast plate 30a. Control rope 42 extends to the operator's seat area of a tractor on which coupling unit 20 is mounted, and serves to actuate pivot link 36 by a pulling action thereon.

Coupling unit 20 is adapted to be quickly and easily mounted on a conventional three-point hitch provided on a tractor. As is well known, such three-point hitch devices conventionally are provided with three connecting and lift arms or booms which are pivotal in a vertical plane by power means for raising and lowering a load. Such a three-point lift hitch and its manner of attachment to coupling unit 20 is illustrated in FIGS. 1 and 2. The upper, centrally disposed lift arm or boom 46 has a longitudinally adjustable end extension 47 in the nature of a turnbuckle. This outer end of lift arm 46 is apertured as indicated at 48 for attachment to an implement or load carrying device. To this end, mast 30 is provided with through holes 50 to accommodate a retention pin 52. With lift arm extension 47 inserted between the spaced side walls of mast 30, it is attached thereto by inserting pin 52 through holes 50 and the aligned aperture in the end 48 of lift arm 46. Retention pin 52 may be held in place by inserting a lock pin or cotter pin 54 through a hole in one end thereof in a well known manner. The two remaining, relatively widely spaced lift arms or booms 56 and 58 of the three-point hitch are apertured as shown at 56a and 58a for adjustable connection to support pins 60 and 62 affixed to the vertical legs or segments 22 and 24 of coupling unit 20. Holes 64 extending through pins 60 and 62 serve to accommodate a cotter pin as illustrated in FIG. 2 to hold lift arms 56 and 58 in place. Side mounted lift bars 66 and 68, of longitudinally adjustable construction similar to lift boom 46 have bifurcated ends by means of which they are attached to lift arms 56 and 58 by a removable pin. Lift arms 56 and 58 are pivotally supported at their inner ends on a cross shaft 70. The longitudinal axis of shaft 70 defines a rotational axis about which lift arms 58 may be rotated up and down as indicated by the directional arrows in FIG. 1. Shaft 70 is mounted on the rear end of a tractor as illustrated in FIG. 2 in a known manner. The three-point hitch assembly further includes a rotary shaft 72 which is normally hydraulically actuated by means not shown to rotate about its longitudinal axis. Crank members as illustrated at 74a and 74b extending from lift shank 72 are rotatable therewith, and serve as connecting points for the inner ends of lift booms or arms 46, 66 and 68. It will be understood that as shaft 70 is rotated by power means under the control of the tractor operator, lift booms or arms 46, 66 and 68 may be pivoted upwardly and downwardly to raise and lower coupling unit 20, and lift fork unit 1 therewith. Thus, with coupling unit 20 mounted on a tractor three-point hitch assembly as described above, it may be used in conjunction with lift fork unit 1 to raise and transport loads, such as the large, round hay bale 16 illustrated in FIG. 2.

In FIGS. 3 and 4 I have illustrated the manner in which removable wall assemblies may be utilized to quickly and easily convert lift fork unit 1 into a bale transporting and feeding container. Each of the upright wall assemblies 76 and 78 is comprised of a side wall segment and a rear wall segment, formed to cooperate with upright frame 2 of the lift fork unit so as to define a hay bale containing enclosure. Upright wall assembly 6 is comprised of side wall segment 80 and rear wall segment 84, and upright wall assembly 78 is comprised of corresponding side wall and rear wall segments 82 and 86 respectively. The normally open front end of the container may be closed after loading by gate means swingably mounted on the front end thereof. Preferably, the gate means is comprised of a pair of gate sections 88 and 90 pivotal from fully open, nonobstructing positions with respect to the front end of the container to a closed position across the front end thereof. One of the gate sections 88 is shown in its closed position in FIG. 3.

The aforesaid side and rear wall segments of the container wall structure are joined together along rear corner posts 92 and 94. These corner posts cooperate with vertical posts 96 and 98 at the front ends of the side wall sections 80 and 82 to support a plurality of horizontally extending beam members forming a portion of the side wall structure. Thus, side wall section 80 includes vertically spaced, horizontally extending beam members 80a, 80b and 80c affixed between upright posts 92 and 96; and side wall section 82 is comprised of corresponding, vertically spaced beam members 82a, 82b and 82c. Similarly, rear wall segments 84 and 86 are comprised of vertically spaced, horizontally extending beams or bars 84a, 84b, 84c and 86a, 86b and 86c, respectively. These horizontal bars are supported at their inner ends on rear, corner posts 92 and 94, and extend freely at their opposite ends for unobstructed connection to the opposite sides of lift fork, upright frame 2. The side and rear wall sections of the wall structure are completed by a plurality of vertical bars 91, 93 and 97. These upright bars are horizontally spaced as shown in order to provide a plurality of vertically extending, animal feeding spaces along the length of the side and rear wall segments of the container wall structure. The spaces between these upright bars are sized so that the head of a stock animal may be inserted therethrough to reach the feeding space inside of the container. Preferably, upright bars 91, 93 and 97 extend only between the middle and top horizontal beam members of the side and rear wall sections so as to provide bottom wall spaces within which solid panels 101, 101a and 101b may be inserted. It is to be noted that bottom wall panels 101a of the rear wall segments 84 and 86 are in alignment with solid wall panel 101b positioned in the bottom of upright frame 2 of the lift fork unit. The solid wall panels 101, 101a and 101b around the bottom of the container periphery serve to prevent the undue loss of hay when cattle are feeding from a large hay bale within the container enclosure through the aforesaid feeding spaces.

Gate sections 88 and 90 are constructed in a similar manner to the side and rear wall segments. Gate section 88 is comprised of vertically spaced, horizontally extending bar segments 88a, 88b and 88c, with spaced apart vertical bars 95 extending between top bar segment 88a and intermediate bar segment 88b. Similarly, gate section 90 is comprised of a plurality of horizontally extending bar segments 90a, 90b and 90c, with horizontally spaced, upright bars 95 extending between the two uppermost bar segments 90a and 90b. Solid closure panels 103 are installed between the two lowermost bar segments of each of the gate sections as illustrated in FIG. 3. Gate sections 88 and 90 are pivotally mounted on the forward ends of wall sections 80 and 82 by means of hinge links 100 as shown. These hinge links are so arranged as to permit each of the gate sections 88 and 90 to be swung to a fully open position as shown in FIG. 3 with respect to gate section 90 about substantially vertical axes.

Upright frame 2 of lift fork unit 1 is constructed to permit the rear wall sections 84 and 86 of the upright wall assemblies 76 and 78 to be removably secured to the opposite sides thereof in a quick and uncomplicated manner. This is accomplished by providing upright frame 2 with a channel-shaped top, horizontal beam member 10, and by providing apertures 106 in the opposite sides of upright frame members 4 and 5, the aperture 106 in upright frame member 4 being illustrated in FIG. 3. Freely extending, upper horizontal support bars 84a and 86a of rear wall segments 84 and 86 are slidably received within the elongated channel of upper channel beam 10 of the lift fork unit 1. Preferably, support bars 84a and 86a are of such a length that they will abut against each other in substantially the center of channel beam 10. Bottom support bars 84c and 86c of the rear wall segments 84 and 86 are slidably inserted within apertures 106 at the bottom of upright frame members 4 and 5. The rear wall segments 84 and 86 are removably fastened to upright frame 2 of the lift fork unit by means of U-bolts 102 which extend over the top of support bars 84a and 86a and through apertures provided in bracket plate 12 on both the front and rear sides of channel beam 10. Nuts 104 serve to hold U-bolts 102 in place. It will be appreciated that with upright wall assemblies 76 and 78 secured to upright frame 2 of the fork unit 1 in the aforesaid manner, rear wall sections 84 and 86 will cooperate with the upright frame structure 2 of lift fork unit 1 to form therewith a continuous rear wall of a bale handling and feeding enclosure. The inner ends of rear wall panels 101a are inclined as shown to conform to the angle of inclination of upright frame members 4 and 5 in abutting engagement therewith.

As may be clearly noted by reference to FIGS. 3 and 4, lift fork unit 1 and upright wall assemblies 76 and 78 are so constructed and arranged with respect to each other that lift arms 14 and 15 are at a lower level than the lowermost portions of the lift fork unit and wall assemblies 76 and 78. This is accomplished by positioning the lift arms 14 and 15 below the lowermost cross beam 6 of lift fork unit 1, and by vertically locating support apertures 106 for bottom support bars 84c and 86c above lift arms 14 and 15 in upright frame members 4 and 5. Thus with the container apparatus fully assembled by the combination of upright wall assemblies 76 and 78 with lift fork unit 1, lift arms 14 and 15 will be the only elements in contact with the ground when the entire assembly is resting on the ground. This ensures minimum ground friction when attempting to push lift arms 14 and 15 under a large hay bale.

As is indicated in FIGS. 1 and 2, coupling unit 20 may be very easily coupled to upright frame 2 of lift fork unit 1 by simply backing a tractor with coupling unit 1 mounted on its three-point hitch into alignment with lift fork unit 1. Then, the tractor operator must pull control rope 42 in order to pivot latch head 34 to the upright position shown in phantom lines in FIG. 1. The tractor is then further backed up against upright frame 2 of the lift fork unit so as to project latch arm 32 and its head or crossbar 34 through the space between upright members 17a and 17b of frame 2. The control rope 42 is then released, and spring 38 serves to rotate latch arm 32 in a clockwise direction so as to bring latch head 34 to the horizontal, locking position shown in FIGS. 1 and 2. In this position, latch head 34 bears against the forward face of upright frame members 17a and 17b. Lift fork unit 1 may then be used for various lifting and transporting purposes. It is to be noted that the provision of bottom push bar 26 on coupling unit 20 for contact against bottom cross beam 6 of lift fork unit 1 provides maximum pushing action along the bottom of the lift fork unit. This very low pushing action substantially directly behind lift arms 14 and 15 assists in pushing the arms over rough terrain under loads of various kinds.

Large, round hay bales such as that illustrated at 16 in FIG. 2 may be transported from the field to bale storage areas by simply utilizing lift fork unit 1 in combination with coupling unit 20. When it is desired to transport a large hay bale to a feeding area for feeding cattle or other livestock, upright wall assemblies 76 and 78 are removably secured to lift fork unit frame 2 in the manner described above. Then, with gates 88 and 90 swung to their open positions, the tractor operator need only back to the hay bale to force lift arms 14 and 15 under the large bale. Gates 88 and 90 are then closed and secured in their closed position by locking means not shown. After driving to the feeding location, the operator lowers the entire transporting and feeding container to the ground by rotating control shaft 72 to swing support booms or arms 46, 66 and 68 downwardly. Then, the operator need only pull control rope 42 to pivot latch head 34 to its upright, disengaging position and drive forwardly, away from the lift fork-container assembly. The entire assembly of the lift fork unit 1 and container formed by wall assemblies 76 and 78 is left on the ground, in the feeding area. Livestock may feed from the large hay bales supported inside the container on lift arms 14 and 15 by extending their heads through the feeding spaces provided between the upright bars 91, 93, 95 and 97 of the container assembly.

Although I have described my bale handling apparatus with respect to particular preferred embodiments thereof, I anticipate that various changes may be made in the size, shape and construction of the handling apparatus without departing from the spirit and scope of my invention as defined by the following claims.

What is claimed is:

1. A separable assembly of a lift fork unit and a coupler unit for use in conjunction with a tractor lift hitch comprising:
   a lift fork unit comprising an upright frame and a pair of horizontally spaced, elongated lift arms projecting generally horizontally from adjacent the bottom of said frame, said upright frame including coupling means for lifting engagement by a coupling device;
   a coupler unit adapted for attachment to a tractor lift hitch and comprising a rigid, upstanding structural portion and latch means mounted thereon, said latch means being releasably engaged with said coupling means on said lift fork unit; and
   a pair of upright wall assemblies removably secured to opposite sides of said upright frame of said lift fork unit and having wall means cooperating therewith to define a hay bale handling and feeding container with cooperating wall means to substantially embrace and contain a large hay bale, said wall means having animal feeding spaces therein through which livestock may project their heads to feed on a large hay bale within said container, whereby a large hay bale supported on said lift arms within said container may be fed to cattle utilizing said lift fork unit and container assembly by lowering said lift fork unit to the ground with a tractor lift hitch to which said coupler unit is attached and disengaging said coupler unit from said lift fork unit.

2. Apparatus as defined in claim 1 wherein:
said latch means is movable between coupling and non-coupling positions relative to said coupling means by control means operably associated therewith, said control means including an actuating device operable from the driver's seat of the tractor vehicle on which said coupler unit is mounted.

3. Apparatus as defined in claim 2 wherein:
a spring normally biases said latch means in said coupling position, and said control means is operative to overcome the bias of said spring.

4. Apparatus as defined in claim 1 wherein:
said upright frame of said lift fork unit includes a cross beam adjacent the bottom thereof; and
said coupler unit includes a cross member adjacent the bottom thereof which bears against the rear face of said lift fork cross beam on the opposite side of said lift fork unit from said horizontally projecting lift arms for pushing said lift arms under a load.

5. Apparatus as defined in claim 1 wherein:
said wall means of each of said upright wall assemblies includes a side and a rear wall segment, with said rear wall segments being removably secured to opposite sides of said upright frame of said lift fork unit; and
said wall means further including gate means swingably mounted at the front end thereof for swinging movement from a closed position across the front of said container to an open, non-obstructing position with respect to the front end of said container for picking up a hay bale therein.

6. Apparatus as defined in claim 1 wherein:
said wall means of each of said upright wall assemblies includes a rear wall segment with horizontally extending support elements slidably received within complementary support portions on each side of said upright frame of said lift fork unit.

7. Apparatus as defined in claim 1 wherein:
said lift arms of said lift fork unit are at a lower level than the lowermost portions of said wall means and are the only elements of said apparatus in contact with the ground when said lift fork unit and container assembly is resting on the ground.

8. A separable assembly on a lift fork unit and a coupler unit for use in conjunction with a tractor lift hitch comprising:
a lift fork unit comprising an upright frame and a pair of horizontally spaced, elongated lift arms projecting generally horizontally from adjacent the bottom of said frame, said upright frame including coupling means for lifting engagement by a coupling device comprising a horizontally extending lift member supported between a pair of spaced apart, upright members of said upright frame; and
a coupler unit adapted for attachment to a tractor lift hitch and comprising a rigid, upstanding structural portion and latch means mounted thereon, said latch means comprising a latch arm extending substantially horizontally between said upright members directly under said lift member for lifting engagement therewith, and said latch arm having a crossbar thereon which spans the space between said upright members and bears against one side thereof opposite the side of said upright frame of said lift fork unit against which said coupler is positioned for lifting said lift fork unit when said latch arm is in a coupling position, and said latch arm being rotatable between said coupling position and a non-coupling position wherein said crossbar is substantially upright for withdrawing movement between said upright members to disengage said coupling unit from said lift fork unit.

9. A separable assembly of a lift fork unit and a coupler unit for use in conjunction with a tractor lift hitch comprising:
a lift fork unit comprising an upright frame and a pair of horizontally spaced, elongated lift arms projecting generally horizontally from adjacent the bottom of said frame, said upright frame including coupling means for lifting engagement by a coupling device; and
a coupler unit adapted for attachment to a tractor lift hitch and comprising a rigid, upstanding structure having an upper mast segment which includes means for the attachment of the middle, pivotal lift hitch boom of a three-point lift hitch on a tractor, and a pair of horizontally spaced, vertical segments having means thereon for attachment to the outer ends of the two outside, pivotal lift booms of said tractor three-point lift hitch; and
latch means mounted on said upper mast segment, said latch means being releasably engaged with said coupling means on said lift fork unit.

10. A separable assembly of a lift fork and container wall structure for handling and feeding hay bales comprising:
a lift fork unit comprising an upright frame and a pair of spaced apart lift arms projecting generally horizontally from adjacent the bottom of said frame; and
a pair of upright wall assemblies removably secured to opposite sides of said upright frame of said lift fork unit and having wall means cooperating with said upright frame to define a hay bale containing enclosure, and said wall means having open spaces therein through which livestock may project their heads to feed on a hay bale contained within said enclosure on said lift arms, whereby said lift fork unit may be used alone for lifting purposes or in combination with said removable, upright wall assemblies for transporting and feeding hay bales; and
gate means movably mounted at the front end of said wall means for movement from a closed position across the normally open front end of said enclosure to an open, non-obstructing position with respect to the front end of said enclosure for picking up a hay bale therein on said lift arms.

11. Apparatus for handling and feeding hay bales as defined in claim 10 wherein:
said wall means of each of said upright wall assemblies includes a side wall segment, and said gate means comprises a pair of upright gate sections, each of which is swingably mounted on the front end of one of said side wall segments by hinge means defining substantially vertical axes about which said gate sections may be swung between said open and closed positions.

12. Apparatus for handling and feeding hay bales as defined in claim 10 wherein:
said lift arms of said lift fork unit are at a lower level than the lowermost portions of said wall means and are the only elements of said apparatus in contact with the ground when said assembly is resting on the ground.

13. A separable assembly of a lift fork and container wall structure for handling and feeding hay bales comprising:
a lift fork unit comprising an upright frame and a pair of spaced apart lift arms projecting generally horizontally from adjacent the bottom of said frame; and
a pair of upright wall assemblies removably secured to opposite sides of said upright frame of said lift fork unit and having wall means cooperating with said upright frame to define a hay bale containing enclosure, said wall means of each of said upright wall assemblies comprising a side and a rear wall segment, with said rear wall segments being removably secured to opposite sides of said upright frame of said lift fork unit and forming together therewith a continuous rear wall of said enclosure, and said wall means having open spaces therein through which livestock may project their heads to feed on a hay bale contained within said enclosure on said lift arms, whereby said lift fork unit may be used alone for lifting purposes or in combination with said removable, upright wall assemblies for transporting and feeding hay bales.

14. Apparatus for handling and feeding hay bales as defined in claim 13 wherein:
said upright frame of said lift fork unit includes a horizontally extending lift member for engagement by power lift apparatus mounted on a tractor vehicle.

15. Apparatus for handling and feeding hay bales as defined in claim 13 wherein:
said rear wall segments include vertically spaced, generally horizontally extending support elements slidably received within complementary support portions on each side of said upright frame of said lift fork unit.

16. Apparatus for handling and feeding hay bales as defined in claim 15 wherein:

said upright frame of said lift fork comprises a plurality of rigid, spaced apart, upright members and horizontal beam members extending therebetween, one of said beam members being shaped to provide an elongated, horizontally extending channel within which one of said horizontally extending support elements on each of said rear wall segments is slidably received; and removable fastening means attaching said support elements to said one horizontal beam member of said upright frame of said lift fork.

17. Apparatus for handling and feeding hay bales as defined in claim 16 wherein:

said one horizontal beam member extends across the top of said upright frame of said lift fork unit, and said support elements slidably received in said channel formed therein are in the form of elongated bars comprising the uppermost structural elements of said rear segments of said upright wall assemblies.

* * * * *